UNITED STATES PATENT OFFICE.

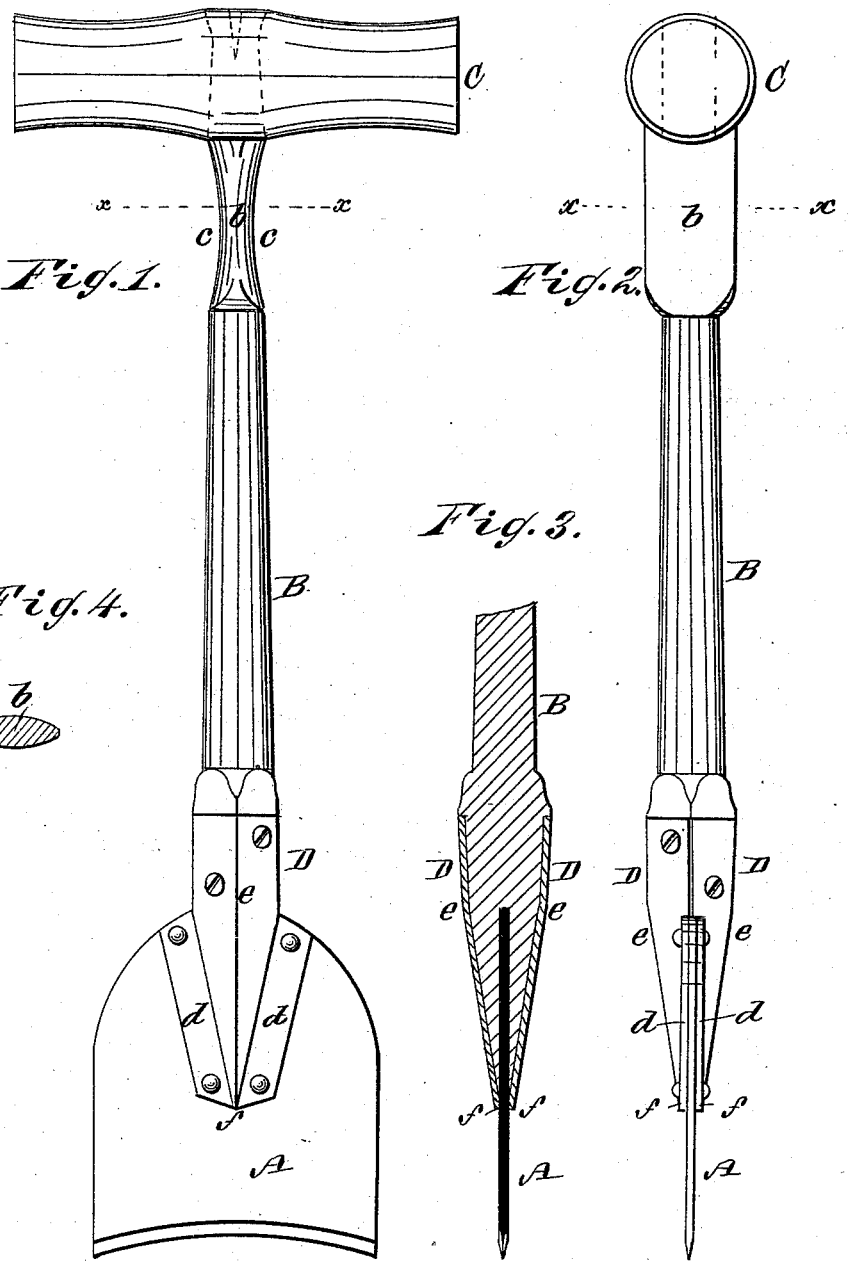

FREDERICK VISSCHER, OF MOUNT STERLING, KENTUCKY.

KNIFE FOR HARVESTING TOBACCO.

SPECIFICATION forming part of Letters Patent No. 316,924, dated April 28, 1885.

Application filed January 21, 1884. (Model.)

*To all whom it may concern:*

Be it known that I, FREDERICK VISSCHER, of Mount Sterling, in the county of Montgomery and State of Kentucky, have invented a new and useful Improvement in Knives for Harvesting Tobacco, of which the following is a full, clear, and exact description.

In gathering tobacco it is usual to first top the plant, at about the eighth or tenth leaf, several days before harvesting. When gathering, it is customary to first strike the topped stalk on its upper end with a knife, and split it within a few inches of the ground, and then to sever the stalk horizontally at the ground. The knife ordinarily employed for these operations has its stem made of iron, and this, coupled with its shape where the handle holds it, subjects the operator to much bruising and injury, besides giving a very imperfect grasp, and the knife otherwise is so constructed as to very imperfectly split the stalk.

My invention consists in forming a wedge at or near the juncture of the handle and cutting-blade of a tobacco-knife, so that the wedge will engage and force its way into the pith of the stalk, to guide the knife in its descent and keep it from slipping sidewise from the stalk, and cause the split stalk to separate, so as to let the hand of the operator pass between the split stalk without touching it.

Reference is to be had to the accompanying drawings, forming part of this specification, in which similar letters of reference indicate corresponding parts in all the figures.

Figure 1 represents a longitudinal face view of a tobacco-knife constructed in accordance with my invention. Fig. 2 is a longitudinal edge view of the same. Fig. 3 is a central longitudinal section of the lower portion of the knife in a plane at right angles to Fig. 1, and Fig. 4 a transverse section of the stem or shank on the lines $x$ $x$ in Figs. 1 and 2.

A is the blade of the knife, which may be of the usual shape and construction; B, its wooden shank or stem; C, its cross-handle, which is also made of wood; and D D, the metallic socket which unites the shank and the blade.

The wooden shank B, which I fit into the handle so that its tenon will not present the usual square shoulder and will be relieved from much objectionable strain, is made of approximately oval shape in its transverse section, as at $b$, with its major axis transverse to the length of the handle and faces of the blade, and with its opposite sides concave or dished, as at $c$ $c$, the whole forming a swell in transverse direction with the handle, and affording an easy seat for the fingers of the hand of the operator on either side of it, and firm grasp of the tool, which will prevent it from turning, and will materially assist in preventing bruising and maiming.

The metallic socket D D is made in two longitudinal half-sections, secured to the inner end of the shank, which is received within them, by screws or otherwise, and to opposite sides of the blade by flanges $d$ $d$, riveted to the blade. The central or body portion of said divided socket is of angular form in its transverse section, and so that each section D thereof presents a sharp or protruding longitudinal edge, $e$, in central relation with the face of the blade on each side of it, and is made sloping on all sides to a point at its outer end, $f$, thus forming a sharp central wedge, which vanishes, or nearly so, low down on the opposite faces of the blade. By this pointed wedge-shaped construction of the socket D D, the same, when splitting the stalk of the plant by downward thrust of the knife before cutting off the stalk close to the ground, is made to keep in the pith and center of the stalk until the whole stroke is completed. Said construction also serves to spread the split stalk sufficiently to keep the hand of the operator from being scratched and mangled as the hand follows the knife down through the stalk. Furthermore, the knife, by thus being made to keep its course and make a clean cut, leaves the cut plant in good condition for curing, which a ragged or bruised cut does not do.

Having thus described my invention, what I claim as new, and desire to secure by Letters Patent, is—

1. A tobacco-knife of the character described, the same consisting in a flat blade, a handle, and a wedge extending from a point at or near the juncture of the blade and handle, on both sides thereof, to a point, $f$, and said wedge inclining in opposite directions from the central edge, $e$, and toward the cutting-edge of the blade, whereby when said blade is forced into and down on a tobacco-stalk the edge e of the wedge will enter the pith and spread the same, so that the hand of the operator will not come in contact with the stalk, substantially as set forth.

2. In a tobacco-knife of the character described, the combination, with the flat blade A, having a concave cutting-edge, of the handle and the wedge formed at the juncture of the blade and handle, the said wedge being on opposite sides of the blade and handle, and formed with the central longitudinal edge, e, and inclined therefrom toward the sides and cutting-edge of the blade, substantially as and for the purpose set forth.

FREDERICK VISSCHER.

Witnesses:
WM. STOFER,
JNO. O. MILLER.